3,274,184
METHOD FOR THE PREPARATION OF
2-STYRYLOXAZOLE COMPOUNDS
Harold Godfred Thompson, Whitehouse Station, N.J., and Martin Barry Bochner, Vienna, W. Va., assignors to American Cyanamid Company, Stamford, Conn., a corporation of Maine
No Drawing. Filed Nov. 30, 1964, Ser. No. 414,883
17 Claims. (Cl. 260—240)

This application is a continuation-in-part of application Serial No. 386,387, filed July 30, 1964, now abandoned.

This invention relates to the preparation of 2-styryloxazole compounds. More particularly, it relates to an improved process for the preparation of 2-styryloxazoles by the condensation of a 2-methyloxazole with an aryl aldehyde. A typical reaction is that between 2-methylbenzoxazole and benzaldehyde to form 2-styrylbenzoxazole according to the equation:

(I)

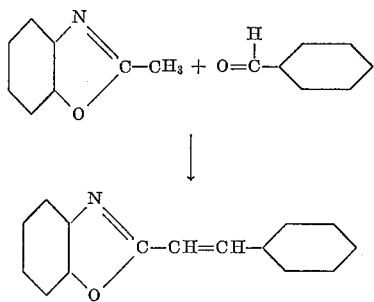

Similarly, the condensation of 2-methylnaphthoxazole with benzaldehyde yields a 2-styrylnaphthoxazole. Again, the condensation involving 2-methylbenzoxazole and a dialdehyde, such as terephthaldehyde, yields 2,2'-(p-phenylenedivinylene)-bisbenzoxazole according to the equation:

(II)

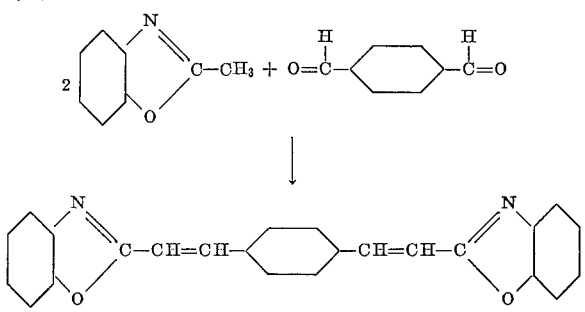

Similarly, a 2-methylnaphthoxazole when condensed with terephthaldehyde yields 2,2'-(p-phenylenedivinylene)-bisnaphthoxazole.

In any of the foregoing reactions, the benzoxazole or naphthoxazole reactants and/or the aryl aldehyde reactant may contain one or more simple ring susbstituents such as lower alkyl groups (1–6 carbon atoms), lower alkoxy (1–6 carbon atoms), hydroxy, carboxy, cyano, nitro and halogen radicals.

The condensation of aldehydes with various compounds containing active methylene groups is well known in the art and has been carried out with varying degrees of success employing a variety of catalysts of both the acid and basic type. Among the reactions which have been shown is the condensation of 2-methylbenzoxazole with benzaldehyde to 2-styrylbenzoxazole. This condensation has been conducted in the presence of condensation catalysts, including piperidine, zinc chloride, boric acid and potassium methylate in methanol. However, all of these reactions have been unsatisfactory, being characterized by slow reaction rate and low product yield (generally below 10% and no greater than about 50%). Also, the products obtained are of low purity. The present invention is concerned with and has for its object the provision of an improved process for effecting the said condensation reaction whereby the aforesaid difficulties are substantially overcome.

In accordance with the invention, it has been found that by conducting the condensation of the benzaldehyde and the 2-methyloxazole in an inert solvent medium in the presence of a novel combination of catalytic agents, viz, a sulfonic acid and a lower dialkyl alkanoyl amide, surprisingly superior results are obtained with respect to reaction rate, yield and quality of product as compared to previously known methods.

Besides being useful intermediates for the preparation of a variety of chemical compounds, the 2-styryloxazoles provided by the process of the invention find important use as optical brighteners for a variety of textile materials, both natural and synthetic, such as cotton, wool, silk, nylon, polyesters, etc. They also effectively brighten a variety of synthetic plastic materials whether woven or solid such as polyacrylates, polyvinyl halides, and the like. Their utility for this purpose is fully disclosed in copending applications S.N. 317,809, filed October 21, 1963, S.N. 335,679, filed January 3, 1964, now U.S. Patent 3,158,610 and S.N. 373,094, filed June 5, 1964. As is well known, brightening agents to be fully effective must be of high purity. A particular advantage of the process of the invention is the fact that the products produced thereby are of such high purity that they may either be used as brighteners directly, i.e., without further purification, or they may be readily purified for such use.

In accordance with the invention, the 2-methyloxazole and the aldehyde are brought together with the sulfonic acid and the lower dialkyl alkanoylamide in an inert solvent. The reaction mixture thus formed is heated at the reflux temperature using an apparatus whereby the water formed, which is contained in the reflux vapor, is collected and continuously removed from the reaction. Formation of water, of course, indicates that the reaction is proceeding and termination of water formation indicates the reaction is complete. When the reaction is complete, the product is recovered from the solvent by suitable means, preferably, steam distillation.

As to reagent proportions, it has been found advantageous to employ a small excess (i.e., about 10%) of the aldehyde over the stoichiometric proportions required for the particular reaction.

With respect to the amount of the sulfonic acid, amounts of from about 0.05 to about 2 mole proportions per mole proportion of the 2-methyloxazole are suitable, the preferred amount being from about 0.1 to about 1.5 moles. The use of about 1.1 mole per mole of the 2-methyloxazole is particularly preferred.

With respect to the lower dialkyl alkanoyl amide, amounts of from about 0.5 to about 5 moles per mole of the 2-methyloxazole are suitable with the preferred amount being from about 1.2 to about 1.5 moles.

The amount of solvent used is not critical except that it should be sufficient to permit easy stirring of the reaction mixture. In general, about 2000 cc. of solvent for each mole of 2-methyloxazole is used.

Sulfonic acids in general can be used in the invention. Thus, the acid may be of the aliphatic or aromatic type. Non-limiting examples of suitable acids include the following: alkyl sulfonic acids, such as methyl, ethyl, butyl, hexyl, cyclohexyl, decyl, dodecyl and octadecyl; alkenyl sulfonic acids, such as propenyl, decenyl and octadecenyl; aryl sulfonic acids, such as phenyl, naphthyl, etc.; alkaryl sulfonic acids, such as methyl-, ethyl-, propyl-, butyl-, hexyl-, decyl-, dodecyl-, octadecyl- and wax-substituted benzene and naphthalene sulfonic acids; and, aralkyl sulfonic acids, such as benzyl, phenethyl, phenoctyl, naphthethyl, naphthoctyl, and the like.

The alkanoylamides suitable for the process include the lower alkyl (1–6 carbon atoms) derivatives of the amides of formic and acetic acids and preferred particularly are dimethylformamide and dimethylacetamide.

Solvents suitable for the process include inert organic solvents, such as high boiling (150–200° C.) aromatic hydrocarbon fractions, toluene, xylene, chlorobenzene, orthodichlorobenzene, etc. The use of a high boiling aromatic hydrocarbon fraction is advantageous in some instances where it has been found to appreciably increase the reaction rate over that obtained with other solvents.

As indicated previously, the process of the invention is applicable to 2-methylnaphthoxazoles and 2-methylbenzoxazoles which may contain ring substituents such as lower alkyl, lower alkoxy, hydroxy, carboxy, nitro, cyano and halogen radicals. As starting materials, the 2-methyloxazoles per se may be used; or, if desired, reaction mixtures containing them, obtained by ring-closing an N-acetyl derivative or an N,O-diacetyl derivative of an o-aminophenol or o-aminonaphthol, may be employed.

Non-limiting examples of 2-methyloxazole compounds which may be used in the invention are the following:

2-methylbenzoxazole
2,5-dimethylbenzoxazole
2-methyl-5-methoxybenzoxazole
2-methyl-4-hydroxybenzoxazole
2-methyl-4-carboxybenzoxazole
2-methyl-4-cyanobenzoxazole
2-methyl-5-nitrobenzoxazole
2-methyl-4-chlorobenzoxazole
2-methyl-4-bromobenzoxazole
2-methylnaphth[1,2-d]oxazole
2,9-dimethylnaphth[1,2-d]oxazole
2-methyl-6-cyclohexylnaphth[1,2-d]oxazole
2-methyl-8-methoxynaphth[1,2-d]oxazole
2-methyl-9-carboxynaphth[1,2-d]oxazole
2-methyl-8-hydroxynaphth[1,2-d]oxazole
2-methyl-8-cyanonaphth[1,2-d]oxazole
2-methyl-8-nitronaphth[1,2-d]oxazole
2-methyl-8-chloronaphth[1,2-d]oxazole
2-methyl-9-carboxynaphth[2,3-d]oxazole
2-methyl-5-chloronaphth[2,1-d]oxazole Non-limiting examples of the aryl aldehydes utilizable in the invention include the following:

benzaldehyde
anisaldehyde
tolualdehyde
isophthalaldehyde
terephthaldehyde
o-hydroxybenzaldehyde
o-nitrobenzaldehyde
o-cyanobenzaldehyde
m-chlorobenzaldehyde
p-chlorobenzaldehyde
1-naphthaldehyde
8-methyl-1-naphthaldehyde
2-methoxy-1-naphthaldehyde
2-hydroxy-1-naphthaldehyde
8-carboxy-1-naphthaldehyde
2-cyano-1-naphthaldehyde
2-chloro-1-naphthaldehyde A complete understanding of the invention and the advantages afforded thereby will be had from the following illustrative examples in which all parts given are by weight.

EXAMPLES 1–5

*Preparation of 2-styrylnaphth[1,2-d]oxazole*

To 341 parts (3.21 M) of xylene in a reflux apparatus fitted with a Barrett trap for removal of water condensed from the reflux vapors there was added 36.6 parts (0.2 M) of 2-methylnaphth[1,2-d]oxazole, 40 parts (0.23 M) of p-toluenesulfonic acid, 18.9 parts (0.26 M) of dimethylformamide and 23.3 parts (0.22 M) of benzaldehyde. The reaction mixture was heated and stirred under gentle reflux (142–145° C.) until there is no further formation of water (i.e., from about 40 to about 50 hours). Twenty parts of anhydrous sodium carbonate, 100 parts of water and a small amount of a surface active agent were added and the mixture was steam distilled to remove the xylene and other volatile material. The product was then washed with water and dried in an oven at 70–80° C.

The above preparation was repeated four times. Pertinent data and results for the five preparations are summarized in Table I.

TABLE I

| Example No. | Reaction Time, Hours | Percent Yield Product as is | Percent Assay [1] | Percent Yield of Theory | M. P., ° C. |
|---|---|---|---|---|---|
| 1 | 39.5 | 93.0 | 94.0 | 87.5 | 119–124 |
| 2 | 48 | 97.6 | 94.0 | 91.7 | 123–126 |
| 3 | 48 | 100 | 93.0 | 93.0 | 123–126 |
| 4 | 39.5 | 96.4 | 94.0 | 90.5 | 122–125 |
| 5 | 39.5 | 97.8 | 96.5 | 94.4 | 122–125.5 |

[1] Ultraviolet Spectrophotometric Method.

EXAMPLE 6

A condensation reaction between 2-methylnaphth[1,2-d]oxazole and benzaldehyde was carried out according to the procedure of Examples 1–5 except that dodecylbenzene sulfonic acid was used in place of p-toluene sulfonic acid. In this instance, 47.5 parts of solid product, having a melting point of 124.7–126.2° C., was obtained. (Yield=87.5% of theory.)

The high yield and purity of the product and the relatively short reaction time provided by the process of the invention as shown in Examples 1–6 are, indeed, surprising in view of the poor results obtained by the use of either the sulfonic acid or the alkanoyl amide alone, as shown in the following series of examples.

EXAMPLES 7–13

For purpose of comparison, the results of a series of reactions between 2-methylnaphth[1,2-d]oxazole and benzaldehyde in which the p-toluene sulfonic acid and alkanoyl amide catalysts were used separately and in combination are shown in Table II. The procedure used was similar to that of Examples 1–5, except for modifications indicated with respect to removal of water of condensation (Example 11) and solvent employed (Examples 12 and 13). Also, the amount of p-toluene sulfonic acid employed in all instances was 0.02 mole (per 0.2 mole of 2-methylnaphthoxazole) except for Example 12 where 0.2 mole was used.

TABLE II

| Example No. | Catalyst | Solvent or Remarks on Modification | Yield or Extent of Reaction, Percent | Reaction Time, Hours |
|---|---|---|---|---|
| 7 | DMF | Xylene | 0 | 49 |
| 8 | PTSA | ----do---- | [1] 22 | 49 |
| 9 | PTSA-DMF | ----do---- | [1] 97 | 51 |
| 10 | PTSA-DMA | ----do---- | [2] 93 | 43 |
| 11 | PTSA-DMF | Xylene-Total reflux-water not removed. | [2] 19.4 | [3] 146 |
| 12 | PTSA-DMA | Aromatic Hydrocarbon Mixture [4] (0.2 M PTSA). | [1] 86 | 12 |
| 13 | PTSA | o-Dichlorobenzene (180° C.). | [2] 75 | 143 |

[1] Extent of reaction determined by yield of isolated product.
[2] Extent of reaction determined spectrophotometrically on aliquot of reaction mixture. Product was highly impure.
[3] Terminate.
[4] Commercial aromatic hydrocarbon mixture comprised essentially of alkylated benzenes, B.P. 171-175° C.

It will be seen from Table II that use of p-toluene sulfonic acid (PTSA) or dimethylformamide (DMF) alone (Examples 7 and 8) provides very poor results, whereas the use of the two together (Examples 9 and 10) provides highly satisfactory results. Also, it is seen that removal of the water of condensation from the reaction is necessary for the condensation to proceed satisfactorily (Example 11). Also, use of a high boiling aromatic hydrocarbon solvent substantially increases the rate of reaction (Example 12). Finally, it is seen that when PTSA is used alone as catalyst in a high boiling solvent, such as o-dichlorobenzene, condensation does occur to a substantial extent over a prolonged heating period. However, the product is very impure and cannot be isolated satisfactorily in good yield (Example 13).

It is seen then that the obtainment of a product of good quality in high yield within a reasonable time requires the use of the sulfonic acid and the alkanoylamide catalysts together in a solvent and that the water of condensation be removed from the reaction as it is formed.

EXAMPLES 14-25

A series of condensations were carried out using various 2-methyloxazoles and aryl aldehydes as reactants. The procedure used was similar to that of Examples 1-5 except that the proportion of PTSA used was 0.02 mole per 0.2 mole of the 2-methyloxazole reactant. As in Examples 1-5, a proportion of 0.2 mole of the 2-methyloxazole to 0.22 mole of aldehyde was used except that where the aldehyde was a dialdehyde, such as isophthaldehyde or terephthaldehyde, the amount of the 2-methyloxazole reactant was 0.4 mole and the amount of the aldehyde was 0.24 mole. Also, approximately 400 ml. of xylene per 0.2 mole of 2-methyloxazole were used as solvent. It is pointed out that the main purpose of these preparations was to provide products for testing as brightening agents. Accordingly, relatively short heating periods (15 to 24 hours) were used with no particular regard as to whether further heating would result in more complete reaction.

Pertinent data and results are summarized in Table III.

While the present invention has been described and illustrated in terms of specific embodiments and examples, it is not intended that the scope thereof be limited in any way thereby, but only as indicated in the following claims.

What is claimed is:

1. A method for preparing a 2-styryloxazole compound which comprises the steps of:
   (1) forming a reaction mixture comprising (a) a 2-methyloxazole compound selected from the group consisting of substituted and unsubstituted 2-methylbenzoxazoles and substituted and unsubstituted 2-methylnaphthoxazoles, the substituents of said substituted oxazoles being selected from the group consisting of lower alkyl, lower alkoxy, hydroxy, carboxy, cyano, nitro and halogen radicals, (b) an aryl aldehyde selected from the group consisting of substituted and unsubstituted benzene aldehydes and substituted and unsubstituted naphthalene aldehydes, the substituents of said substituted aldehydes being selected from the group consisting of lower alkyl, lower alkoxy, hydroxy, carboxy, cyano, nitro and halogen radicals, (c) a sulfonic acid, (d) a di(lower alkyl) derivative of an alkanoyl amide selected from formamide and acetamide and (e) an inert solvent; the proportions of 2-methyloxazole and aryl aldehyde employed being from substantially stoichiometric proportions to a small excess of the aldehyde and the proportions of the sulfonic acid and alkanoyl amide derivative being, respectively, from about 0.05 to about 2 moles and from about 0.5 to about 5 moles, per mole of the 2-methyloxazole;
   (2) heating the reaction mixture at reflux temperature to effect the condensation of the 2-methyloxazole with the aryl aldehyde;
   (3) removing water of condensation from the reaction mixture, and
   (4) recovering the 2-styryloxazole product from the reaction mixture.

2. The method of claim 1 wherein the 2-methyloxazole compound is 2-methylbenzoxazole and the aryl aldehyde is benzaldehyde.

3. The method of claim 1 wherein the 2-methyloxazole compound is 2-methylnaphth[1,2-d]oxazole and the aryl aldehyde is benzaldehyde.

4. The method of claim 1 wherein the 2-methyloxazole compound is 2-methylbenzoxazole and the aryl aldehyde is terephthalaldehyde.

5. The method of claim 1 wherein the 2-methyloxazole is 2-methylnaphth[1,2-d]oxazole and the aryl aldehyde is terephthalaldehyde.

6. The method of claim 1 wherein the 2-methyloxazole is 2-methylbenzoxazole and the aryl aldehyde is 1-naphthaldehyde.

7. The method of claim 1 wherein the 2-methyloxazole is 2-methylnaphth[1,2-d]oxazole and the aryl aldehyde is 1-naphthaldehyde.

8. The method of claim 1 wherein the 2-methyloxazole is 2-methylnaphth[1,2-d]oxazole and the aryl aldehyde is 2-hydroxybenzaldehyde.

TABLE III

| Example No. | Oxazole Reactant | Aldehyde Reactant | Heating Period (Hours) | Percent Yield | $\lambda_{max}$, m$\mu$ [1]/M.P., °C. |
|---|---|---|---|---|---|
| 14 | 2-methylbenzoxazole | 2-naphthaldehyde | 20.5 | 100 | 335/134-137 |
| 15 | ----do---- | 1-naphthaldehyde | 18 | 94 | 350/133-134 |
| 16 | ----do---- | Isophthalaldehyde | 20 | 92 | 328/248-250 |
| 17 | ----do---- | Terephthalaldehyde | 21 | 83 | 383/>300 |
| 18 | 2-methylnaphth[1,2-d]-oxazole | 1-naphthaldehyde | 15 | 47 | 368/127-129 |
| 19 | ----do---- | 2-naphthaldehyde | 15 | 93 | 571/178-180 |
| 20 | ----do---- | 2-hydroxybenzaldehyde | 15½ | 61 | 365/234-235 |
| 21 | ----do---- | Terephthalaldehydic acid | 21 | 60 | 355/>300 |
| 22 | ----do---- | 4-chlorobenzaldehyde | 24 | 93 | 352/159-163 |
| 23 | ----do---- | 2-chlorobenzaldehyde | 18 | 96 | 355/160-162 |
| 24 | ----do---- | Terephthaldehyde | 21 | 60 | 393/264-266 |
| 25 | ----do---- | 3-chlorobenzaldehyde | 20 | 87 | [2] 352/110-113 |

[1] Wave-length of maximum absorption by spectrophotometric determination.
[2] Figures for purified material.

9. The method of claim 1 wherein the 2-methyloxazole is 2-methylnaphth[1,2-d]oxazole and the aryl aldehyde is 3-chlorobenzaldehyde.

10. The method of claim 1 wherein the 2-methyloxazole is 2-methylnaphth[1,2-d]oxazole and the aryl aldehyde is terephthalaldehydic acid.

11. The method of claim 1 wherein the sulfonic acid is p-toluene sulfonic acid and the alkanoyl amide derivative is dimethylformamide.

12. The method of claim 11 wherein the proportions of p-toluene sulfonic acid and dimethylformamide are, respectively, from about 0.1 to about 1.5 moles and from about 1.2 to about 1.5 moles per mole of 2-methyloxazole.

13. The method of claim 1 wherein the sulfonic acid is dodecylbenzene sulfonic acid and the alkanoyl amide derivative is dimethylformamide.

14. The method of claim 13 wherein the proportions of dodecylbenzene sulfonic acid and dimethylformamide are, respectively, from about 0.1 to about 1.5 moles and from about 1.2 to about 1.5 moles per mole of 2-methyloxazole.

15. The method of claim 1 wherein the solvent is xylene.

16. The method of claim 1 wherein the solvent is an aromatic hydrocarbon fraction having a boiling point of from about 150° C. to about 200° C.

17. A method for preparing 2-styrylnaphth[1,2-d]-oxazole which comprises the steps of:
  (1) forming a reaction mixture comprising (a) 2-methylnaphth[1,2-d]oxazole, (b) benzaldehyde, (c) dodecylbenzene sulfonic acid, (d) dimethylformamide and (e) xylene, the mole proportion of 2-methylnaphth[1,2-d]oxazole to benzaldehyde being from about 1:1 to about 1:1.1 and the proportions of dodecylbenzene sulfonic acid and dimethylformamide being, respectively, from about 0.1 to about 1.5 moles and from about 1.2 to about 1.5 moles per mole of 2-methylnaphth[1,2-d]oxazole;
  (2) heating the reaction mixture at reflux temperature to effect the condensation of the 2-methylnaphth[1,2-d]axazole with the benzaldehyde;
  (3) removing water of condensation from the reaction mixture, and
  (4) recovering the 2-styrylnaphth[1,2-d]oxazole product from the reaction mixture by steam distillation.

References Cited by the Examiner

FOREIGN PATENTS 1,336,949  7/1963  France.

OTHER REFERENCES

Postovskii et al.: Zh. Obshch. Khim., volume 32, pages 2617 to 2624 (1962).

Theilheimer: Synthetic Methods of Organic Chemistry, vol. 16, pages XI and XV (preface), S. Karger (N.Y., 1962).

Chemical Abstracts I, volume 45, col. 537, 1951, abstract of Waldmann et al.

Chemical Abstracts II, volume 53, col. 9698, 1959, abstract of Rajadhyakashi et al.

JOHN D. RANDOLPH, *Primary Examiner.*

UNITED STATES PATENT OFFICE
CERTIFICATE OF CORRECTION

Patent No. 3,274,184            September 20, 1966

Harold Godfred Thompson et al.

It is hereby certified that error appears in the above numbered patent requiring correction and that the said Letters Patent should read as corrected below.

Columns 5 and 6, Table III, sixth column, under the heading "$\lambda_{max.}, M\mu^{1}/M.P., °C.$", line 6, for "571/178-180" read -- 371/178-180 --; column 8, line 10, for "2-d]axazole" read -- 2-d]oxazole --.

Signed and sealed this 22nd day of August 1967.

(SEAL)
Attest:

ERNEST W. SWIDER            EDWARD J. BRENNER
Attesting Officer            Commissioner of Patents